United States Patent
Natoli et al.

(10) Patent No.: US 10,414,386 B2
(45) Date of Patent: Sep. 17, 2019

(54) RECREATIONAL VEHICLE BRAKING SYSTEM

(71) Applicants: Michael E. Natoli, Foristell, MO (US); Robert G. Stanford, Kodiak, AK (US)

(72) Inventors: Michael E. Natoli, Foristell, MO (US); Robert G. Stanford, Kodiak, AK (US)

(73) Assignee: Michael E. Natoli, Foristell, MO (US)

( * ) Notice: Subject to any disclaimer, the term of this patent is extended or adjusted under 35 U.S.C. 154(b) by 102 days.

(21) Appl. No.: 15/626,802

(22) Filed: Jun. 19, 2017

(65) Prior Publication Data

US 2017/0361814 A1    Dec. 21, 2017

Related U.S. Application Data

(60) Provisional application No. 62/352,174, filed on Jun. 20, 2016.

(51) Int. Cl.
| | |
|---|---|
| *B60T 7/16* | (2006.01) |
| *B60K 28/04* | (2006.01) |
| *B60T 7/14* | (2006.01) |
| *B60T 13/66* | (2006.01) |
| *B60T 7/12* | (2006.01) |
| *B60L 3/02* | (2006.01) |

(52) U.S. Cl.
CPC ............. *B60T 7/14* (2013.01); *B60K 28/04* (2013.01); *B60T 7/12* (2013.01); *B60T 7/16* (2013.01); *B60T 13/662* (2013.01); *B60L 3/02* (2013.01); *B60T 2220/00* (2013.01); *B60Y 2200/252* (2013.01); *B60Y 2302/05* (2013.01)

(58) Field of Classification Search
CPC ..... B60T 7/14; B60T 7/16; B60T 7/12; B60L 3/02; B60K 28/04; B60Y 2200/252; B60Y 2200/20; B60Y 2302/05; Y10S 200/02

USPC ........ 180/272, 190, 182; 303/19; 280/28.11; 200/DIG. 2

See application file for complete search history.

(56) References Cited

U.S. PATENT DOCUMENTS

| | | | |
|---|---|---|---|
| 5,642,788 A | 7/1997 | Mabbott | |
| 6,000,487 A | 12/1999 | Caple | |
| 2004/0156327 A1* | 8/2004 | Yankielun | G08C 17/02 370/310 |
| 2008/0257627 A1* | 10/2008 | Hues | A63C 5/085 180/180 |
| 2016/0101803 A1* | 4/2016 | Ahlemeier | B62B 9/08 180/167 |

FOREIGN PATENT DOCUMENTS

| | | |
|---|---|---|
| EP | 0349896 A2 | 1/1990 |
| EP | 0992386 A1 | 4/2000 |
| WO | 2011/132853 A2 | 10/2011 |

OTHER PUBLICATIONS

European Extended Search Report, "Communication of the Extended Search Report and Search Opinion" by the European Patent Office in Munich, Germany, for European Application No. 17176930.0, dated Nov. 14, 2017, 7 pages.

* cited by examiner

*Primary Examiner* — Keith J Frisby
(74) *Attorney, Agent, or Firm* — Zarley Law Firm, PLC

(57) ABSTRACT

A recreational vehicle braking system having a tether system, a controller system, and a brake. The controller system activates a slowdown timer upon removal of the tether system from the vehicle and then activates a stop timer upon expiration of the slowdown timer.

2 Claims, 4 Drawing Sheets

RECREATIONAL VEHICLE BRAKING SYSTEM

CROSS REFERENCE TO RELATED APPLICATION

This application claims the benefit to U.S. Provisional Application Ser. No. 62/352,174 filed on Jun. 20, 2016.

BACKGROUND OF THE INVENTION

This invention is directed towards a recreational vehicle and more particularly to a braking system for a recreational vehicle.

Typically, when an individual is riding a recreational vehicle such as an all-terrain vehicle or a snowmobile the rider must manually brake the vehicle in order for the vehicle to slow or stop movement. In the event that the rider falls off of, for example, a snowmobile, the snowmobile will slowly decelerate from the rate of speed the snowmobile was travelling at when the rider was dislodged from the snowmobile. When the snowmobile is travelling at a high rate of speed this can result in the snowmobile travelling a very large distance away from the location that the rider was separated from the snowmobile. This is problematic for a number of reasons.

To begin, if a rider is injured and needs their snowmobile to return to seek treatment the snowmobile will be a substantial distance away, which may be difficult or impossible to reach. Additionally, if the rider is near a roadway it is possible that the snowmobile will continue on towards the roadway causing a potential automobile accident if the snowmobile comes near to or enters the roadway.

Even if the rider is not injured and not near a roadway the snowmobile can still be damaged or cause injury. For instance, it is common for snowmobiles to continue movement until an obstacle, such as a tree, rock, or wall is encountered by the snowmobile, which results in significant damage to the snowmobile.

Attempts to address this problem have been made in the art. In particular, U.S. Pat. Nos. 5,642,788 and 6,000,487 disclose tethering systems that are attached to a rider. When the rider falls off of the snowmobile the braking system is activated and the snowmobile is stopped. Despite these advances, problems remain. While useful, tethering devices can be cumbersome and often are tied up and not attached to the rider or a person.

Thus is it is a primary object of the invention to provide a recreational vehicle braking system that improves upon the state of the art.

Another object of the invention is to provide a recreational vehicle braking system that slows prior to stopping.

Yet another object of the invention is to provide a recreational vehicle braking system that is adjustable.

Another object of the invention is to provide a recreational vehicle braking system that is safe.

Yet another object of the invention is to provide a recreational vehicle braking system that is easy to use.

Another object of the invention is to provide a recreational vehicle braking system that reduces costs and lost rental income associated with accidents.

A still further objective is to provide a recreational vehicle braking system that reduces injuries to the rider and others.

These and other objectives will be apparent to one of ordinary skill in the art based upon the following written description.

SUMMARY OF THE INVENTION

A recreational vehicle braking system having a tether system, a controller system, and a brake. The tether system is removably connected to the recreational vehicle. Alternatively, a key fob is wirelessly connected to the controller system.

The controller system is connected to the brake and includes a slowdown timer, a stop timer and/or an odometer. Upon removal of the tether system from the vehicle, the controller system activates the slowdown timer. Upon expiration of the slowdown timer the controller system either activates the brake or activates the stop timer, if activated, the controller system activates the brake. The controller system activates the brake to stop the vehicle abruptly or gradually.

Alternatively, once the tether system is removed from the vehicle, the controller system activates the brake once a predetermined distance is travelled after removal. The controller system also activates the slowdown timer if the key fob exceeds a predetermined distance from the controller system.

DETAILED DESCRIPTION OF THE PREFERRED EMBODIMENT

Figure 1:
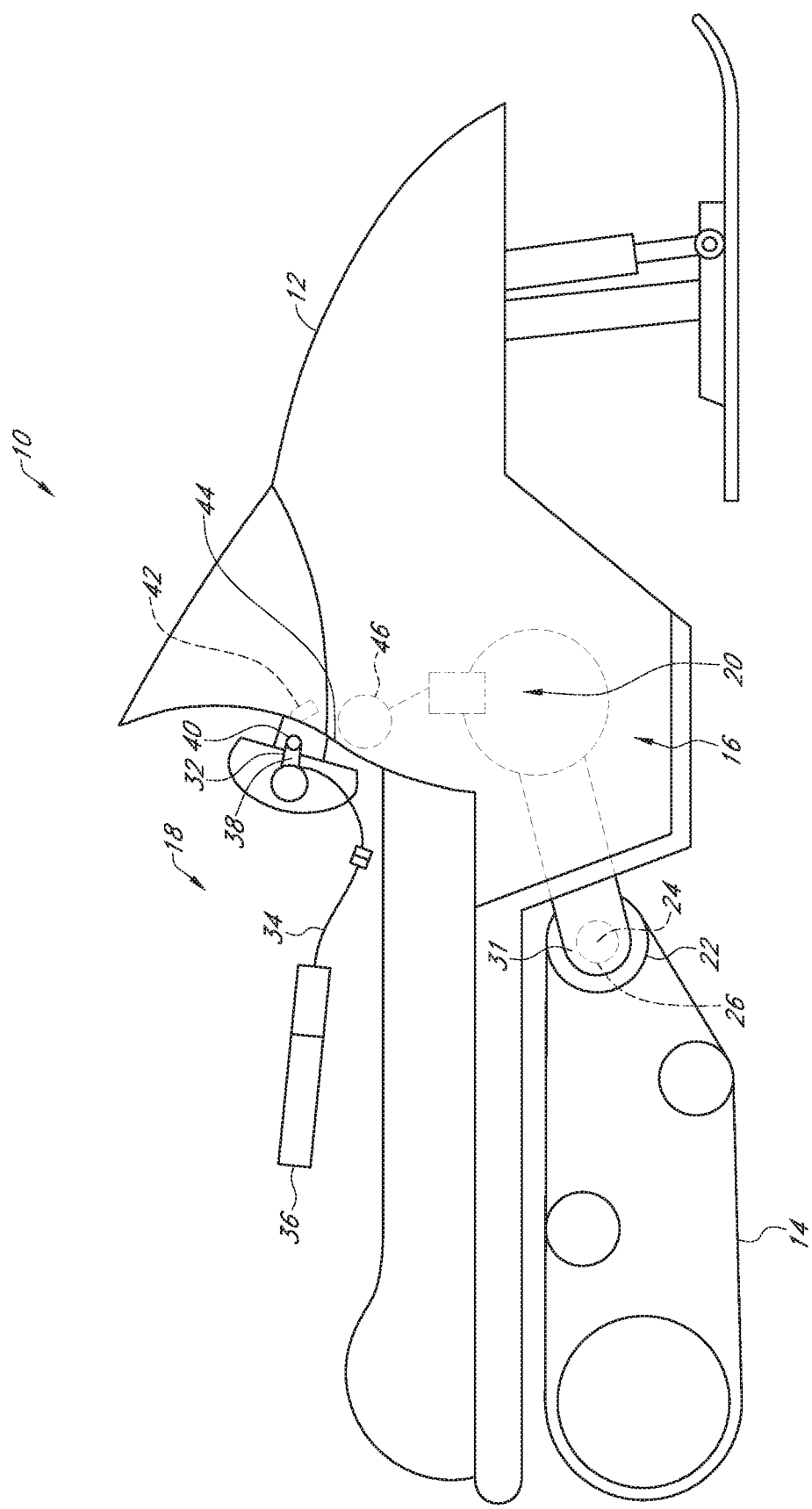
FIG. 1 is a side sectional view of a braking system for a recreational vehicle.
Figure 2:
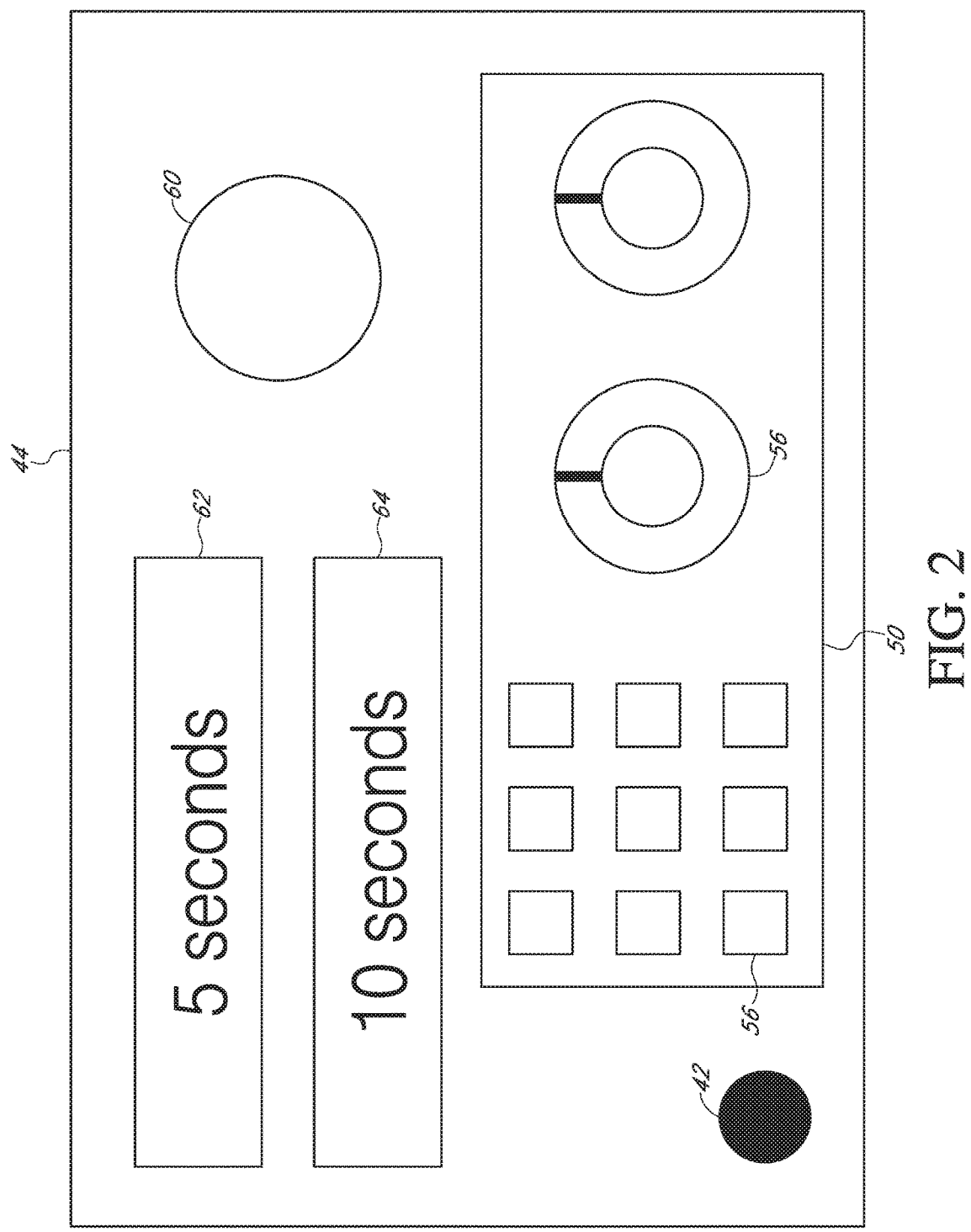
FIG. 2 is a top plan view of a dashboard of a recreational vehicle.
Figure 3:
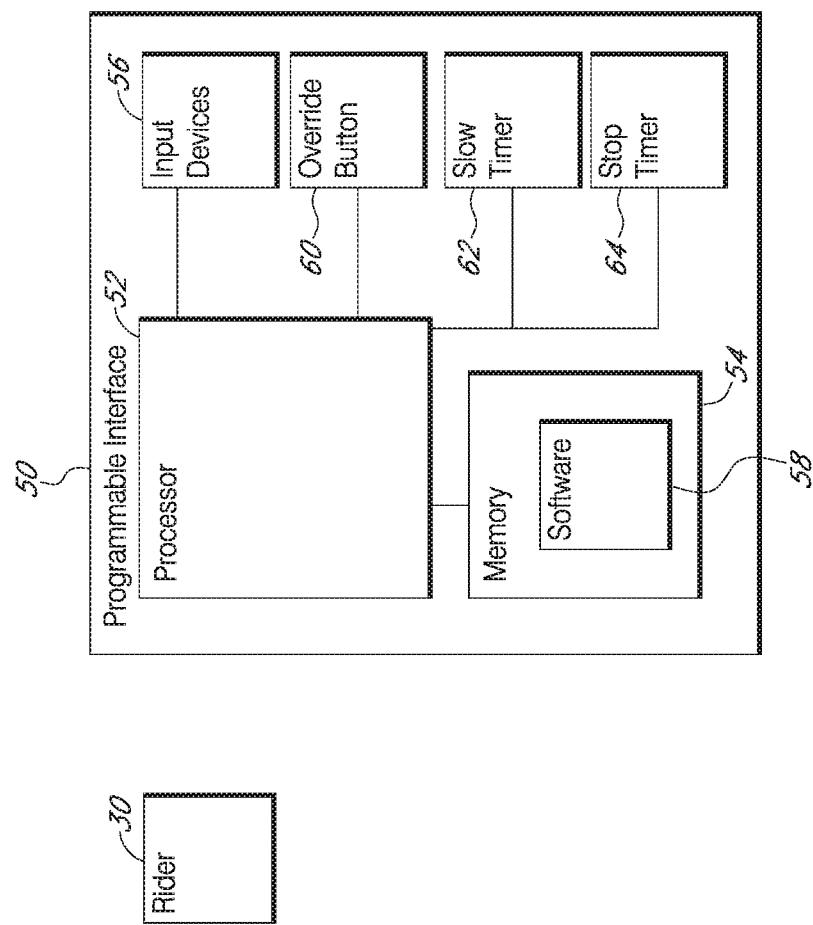
FIG. 3 is a schematic view of a controller system for a recreational vehicle braking system.
Figure 4:
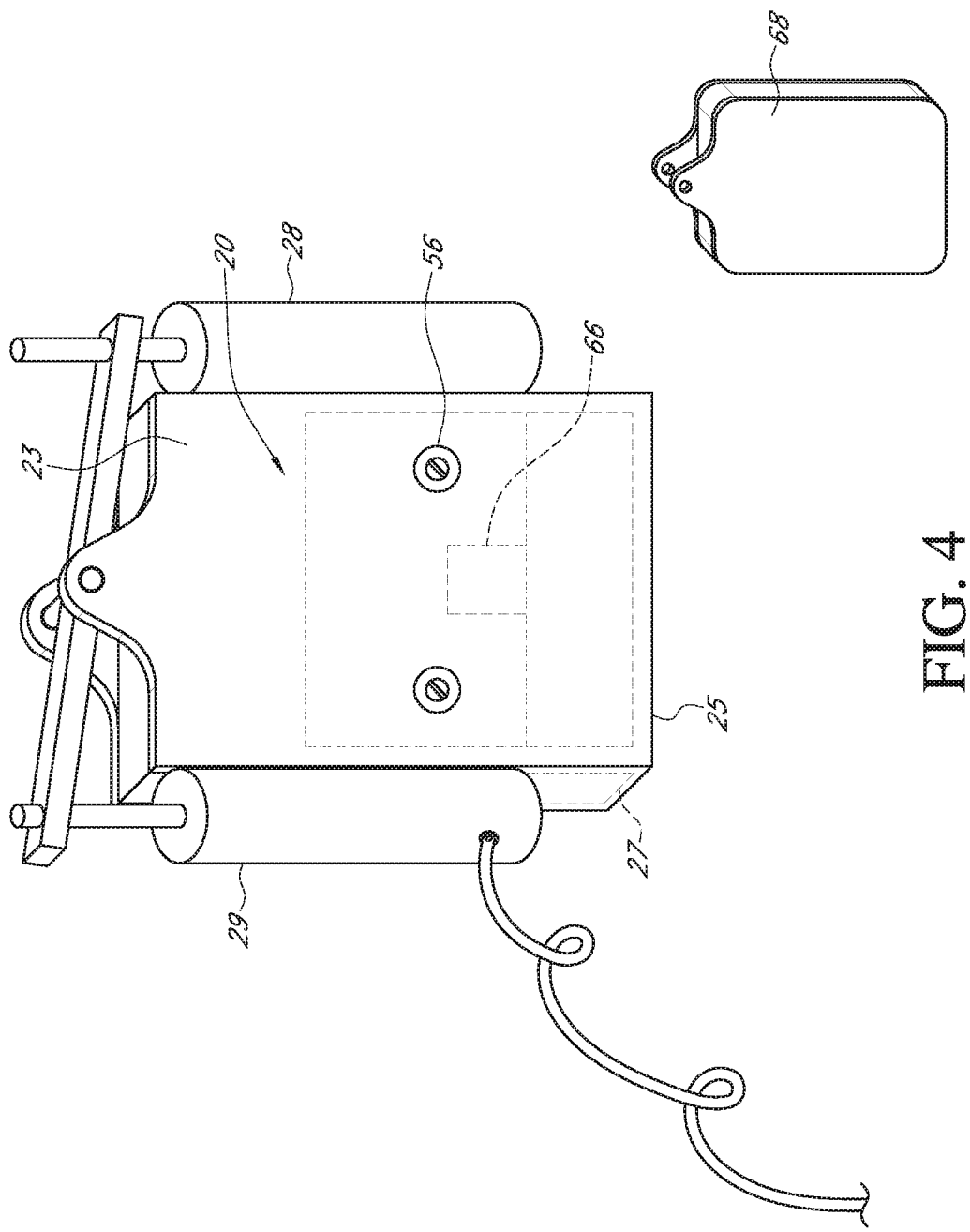
FIG. 4 is a perspective sectional view of a controller system and key fob.

Referring to the Figures, a vehicle braking system 10 is presented that includes a snowmobile 12 having a motorized treaded belt 14, a brake system 16, a tether system 18, and a controller system 20. The system 10 can be used on any type of recreational vehicle and is shown in relation to a snowmobile by example only. The motorized treaded belt 14 is positioned around one or more flywheels 22 that rotate to move the motorized treaded belt 14.

The brake system 16 has a hydraulic brake 24 with one or more brake pads 26. The brake 24 is in communication with a control box 23 that includes a backup battery compartment 25 that houses one or more batteries 27, which are in communication with an electric solenoid 28. The control box 23 is also attached to the battery of the snowmobile. When the electric solenoid 28 is activated it pumps a hydraulic cylinder 29, which activates brake pads 26 against a brake disc 31 and slows the snowmobile to a stop. The brake pads 26 are positioned adjacent one or more flywheels 22 to engage the flywheel 22 when the brake 24 is activated by a rider 30.

The tether system 18 includes an insertion member 32, a strap 34, and a connection member 36. The insertion member 32 is of any shape and size, and in one embodiment is a pin that is cylindrical in shape. On an exterior surface 38 of the insertion member 32 is a protrusion 40. The insertion member 32 is received within an opening 42 on the dashboard 44 of the snowmobile 12. The protrusion 40 of the insertion member 32 is received by a switch 46 of the controller system 20. The switch 46 in one embodiment is a depressible plate. Alternatively, the switch 46 can be an optical switch that detects obstruction caused by the presence of the insertion member 32. In yet another embodiment, the switch 46 is a circuit that is open when the insertion member 32 is absent and closed when the insertion member 46 is present.

Connected between insertion member 32 and the connection member is the strap 34, which is of any size and length. The strap 34 is made of a durable material so that if the rider 30 is violently removed from the snowmobile 12 the strap 34 does not break, snap, or otherwise become damaged.

The connection member 36 is of any suitable size and shape. In one embodiment, the connection member 36 is an adjustable bracelet that fits around the rider's wrist. In another embodiment, the connection member 36 is a clip that attaches to the rider's clothing. The connection member 36 in another arrangement is a band that fits around the rider's waist or any other extremity of the rider 30.

The controller system 20 is mounted within the snowmobile 12 and is in communication with the brake system 16 and tether system 18 to slow the snowmobile 12 with the brake system 16 when the tether system 18 is removed from the snowmobile 12. In one embodiment, the controller system 20 is mounted within the control box 23. The controller system 20 includes a programmable interface 50. The programmable interface 50 has a processor 52, memory 54, and input device 56. The memory 54 stores software 58 to set timed parameters for activating the brake system 16 when the tether system 18 is dislodged from the snowmobile 12. The input devices 56 in one embodiment is a touchscreen display mounted on the dashboard 44 of the snowmobile 12. Alternatively, the input devices 56 can be one or more dials or buttons associated with predetermined amounts of time. In one embodiment, the programmable interface includes an override button 60.

In operation, the rider 30 uses the input device 56 to input predetermined amounts of time into the software 58 for the controller system 20 to activate the brake system 16 to slow or stop the snowmobile 12 after the tether system 18 is removed from the snowmobile 12. These settings are stored on the memory 54. Alternatively, the rider 30 can use a default timing setting of the software 58 stored on the memory 54.

The rider 30 attaches the connection member 36 to their wrist, waist, or clothing. The insertion member 32 is inserted into the opening 42 on the dashboard 44 so the protrusion 40 on the exterior surface 38 of the insertion member 32 depresses the switch 46 of the controller system 20 communicating to the processor 52 that the rider 30 is on the snowmobile 12.

In the event that the rider 30 falls off of the snowmobile 12, the connection member 36 will travel with the rider 30 and pull on the strap 34 of the tether system 18 removing the insertion member 32 from the opening 42 in the dashboard 44. When the insertion member 32 is removed the switch 46 is activated indicating to the controller system 20 that the rider 30 is not on the snowmobile 12. The processor 52 initiates a slowdown timer 62.

When the slowdown timer 62 expires, the controller system 20 activates the brake system 16 to activate the brakes 24 to engage the brake pads 26 against the flywheels 22 to slow the rotation of the motorized treaded belt 14 to slow but not stop the snowmobile 12. The controller system 20 in one embodiment activates the brake system 16 to gradually slow the snowmobile 12 to a slowed speed, but alternatively the controller system 20 abruptly slows the snowmobile 12 by causing the brakes 24 to engage more forcefully or by cutting off power to the flywheels 22. In one embodiment the rider 30 sets the slowed speed on the programmable interface 50.

Once the slowdown timer 62 has expired, the processor 52 initiates a stop timer 64. When the stop timer 64 expires, the controller system 20 activates the brake system 16 to activate the brakes 24 to engage the brake pads against the flywheels to stop the rotation of the motorized treaded belt 14 to stop the snowmobile 12. The controller system 20 in one embodiment activates the brake system 16 to gradually stop the snowmobile. Alternatively, the controller system 20 activates the brake system 16 to abruptly stop the snowmobile 12.

In another arrangement, the controller system 20 activates the brake system 16 to activate the brakes 24 to slow the snowmobile 12 without the processor 52 initiating the slow timer 62 and waiting for it to expire when the tether system 18 is removed. In this embodiment, the processor 52 initiates the stop timer 64 immediately upon removal of the tether system.

In the event that the tether system 18 is removed while the rider 30 is still on the snowmobile 12 and the rider 30 does not want the snowmobile 12 to slow or stop, the rider 30 presses the override button 60. When the override button 60 is pressed, the processor 52 cancels any timers currently running and the braking system 16 is not activated. When the override button 60 is pressed again or the insertion member 32 is reinserted into the opening 42 on the dashboard 44, the processor 52 resets the software 54 to begin new timers if the tether system 18 is removed.

In an alternative embodiment, the memory 54 is preprogrammed with software 58. In one arrangement the software 58 is not reprogrammable by the rider 30. In one embodiment, the software 58 is preprogrammed to continue operation of the snowmobile 12 without application of the brake system 16 for a predetermined amount of time. In one arrangement, the predetermined amount of time is between two and three seconds. Alternatively, or in addition to the predetermined amount of time, the controller system 20 includes an odometer 66 and continues operation of the snowmobile 12 without application of the brake system 12 for a predetermined distance. In this way, other riders who may be following the downed rider 30 are less likely to run over the downed rider 30 as only the downed rider 30 must be avoided, instead of both the downed rider 30 and the unmanned snow mobile 12. Additionally, this provides the advantage of allowing the rider 30 to get clear of the snowmobile 12, while still limiting the distance the snow mobile 12 travels. In another arrangement, the software 58 maintains the current speed of the snowmobile 12 so the snowmobile 12 does not slow and pose a risk.

After the predetermined time and/or distance, the software 58 is preprogrammed to slow operation of the snowmobile 12 by activating the brake system 16 for a predetermined amount of time and/or for a predetermined distance. In one arrangement, the software 58 is preprogrammed to slow operation of the snowmobile 12 for ten seconds. By slowing, rather than fully stopping the snowmobile 12, an abrupt stop is avoided, which avoids risk to other riders and to the snowmobile 12. The software 58 is further preprogrammed to activate the brake system 16 fully to stop the snowmobile. In one embodiment, the brake system 16 is activated until a rider 30 turns the controller system 20 off or until a predetermined amount of time elapses. In one embodiment, the predetermined amount of time is five seconds. In another embodiment, the controller system 20 is turned off and controlled by a wireless key fob 68.

When using the key fob 68, the control system 20 senses and determines the distance the key fob 68 is from the control system based on signals transmitted from the key fob 68 to the control system. When the key fob 68 is within a predetermined distance of the control system 20, a rider 30 may start the snowmobile 12. The control system 20 will not activate the brake 24 so long as the rider 30 and key fob 68 remains on the snowmobile and/or within the predetermined distance. Should a rider 30 dismount voluntarily, they may disengage the control system by pressing override button 60.

Should the rider fall off the snowmobile 12 and the key fob 68 falls beyond the predetermined distance, the control system 20 activates brake 24. Preferably, brake activation occurs in multiple stages where in a first stage the snowmobile 12 continues normal operation, a second stage where the traveling speed of the snowmobile is slowed, and a third stage where full brake force is applied and the snowmobile stopped.

Therefore, a snowmobile braking system 10 that slows prior to stopping, is adjustable, is safe, is easy to use, reduces costs associated with accidents, and improves upon the state of the art has been provided.

From the above discussion and accompanying figures and claims it will be appreciated that the snowmobile braking system 10, offers many advantages over the prior art. It will also be appreciated by those skilled in the art that other modifications could be made without parting from the spirit and scope of the invention and fall within the scope of the claims and are intended to be covered thereby.

What is claimed is:

1. A recreational vehicle braking system, comprising:
   a controller system connected to a recreational vehicle;
   a key fob wirelessly connected to the controller system;
   a brake connected to the controller system;
   wherein when the key fob exceeds a predetermined distance from the controller system, the controller system is configured to operate in three stages, including: a first stage that maintains normal operation; a second stage that activates the brake to slow operation; and a third stage that applies full brake force to stop operation.

2. The system of claim 1 further comprising an override button.

* * * * *